United States Patent [19]

DuFrenne

[11] Patent Number: 4,871,899
[45] Date of Patent: Oct. 3, 1989

[54] TITIABLE ELECTRIC THERMODE FOR MULTIPLE CONNECTION REFLOW SOLDERING

[75] Inventor: Gerald DuFrenne, LaVerne, Calif.

[73] Assignee: Unitek Corporation, Monrovia, Calif.

[21] Appl. No.: 180,631

[22] Filed: Apr. 4, 1988

Related U.S. Application Data

[63] Continuation of Ser. No. 832,835, Feb. 24, 1986, abandoned.

[51] Int. Cl.[4] .......................... H05B 3/00; B23K 3/02
[52] U.S. Cl. ...................................... 219/233; 219/228; 219/243; 219/85.16; 228/51; 228/180.2
[58] Field of Search .................. 219/221, 227–228, 219/230, 233, 235, 243, 85 D, 85 R, 85 G, 85 F; 228/51–55, 19, 20, 129, 180.1, 180.2, 191

[56] References Cited

U.S. PATENT DOCUMENTS

| 1,816,115 | 7/1931 | Helle | 219/85 D |
| 3,608,809 | 9/1971 | Cushman | 228/180.2 |
| 3,948,429 | 4/1976 | Davies et al. | 219/85 D |
| 3,991,297 | 11/1976 | Ammann | 219/233 |
| 4,412,123 | 10/1983 | Ammann et al. | 219/233 |

FOREIGN PATENT DOCUMENTS

| 150706 | 9/1981 | German Democratic Rep. | 228/180.2 |
| 525258 | 9/1926 | U.S.S.R. | 219/228 |

Primary Examiner—Anthony Bartis
Attorney, Agent, or Firm—Christie, Parker & Hale

[57] ABSTRACT

An electrically heated thermode mounts to a support movable to position the thermode for multiple lead reflow soldering and includes a flat resistance element folded on its flat side in a U-shape structure in which the bight portion forms the pressing portion and the legs the terminal portions of the thermode. To overcome a problem arising where a group of joints to be soldered have varying height tops, the way in which the thermode is mounted to the movable support provides freedom of rotational movement of the thermode relative to the support while providing a low resistance electrical connection between support and the thermode terminal portions. To overcome a problem arising because opposite end joints sink more heat than interior joints, terminal plates are shaped and connected to the terminal portions so as to distribute a sheet of current in a way that more of the current flows along side edges than along the interior portion of the U-shaped structure.

8 Claims, 3 Drawing Sheets

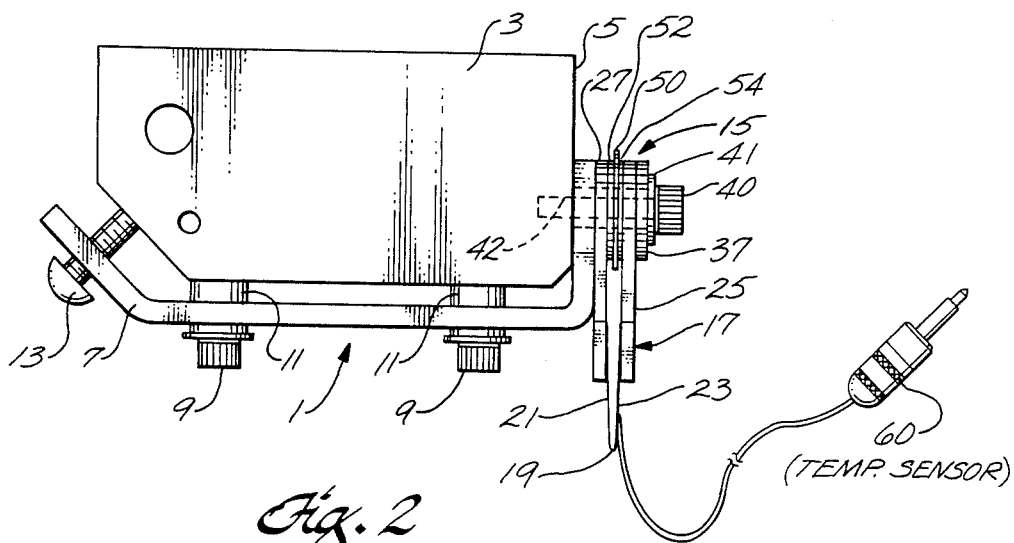
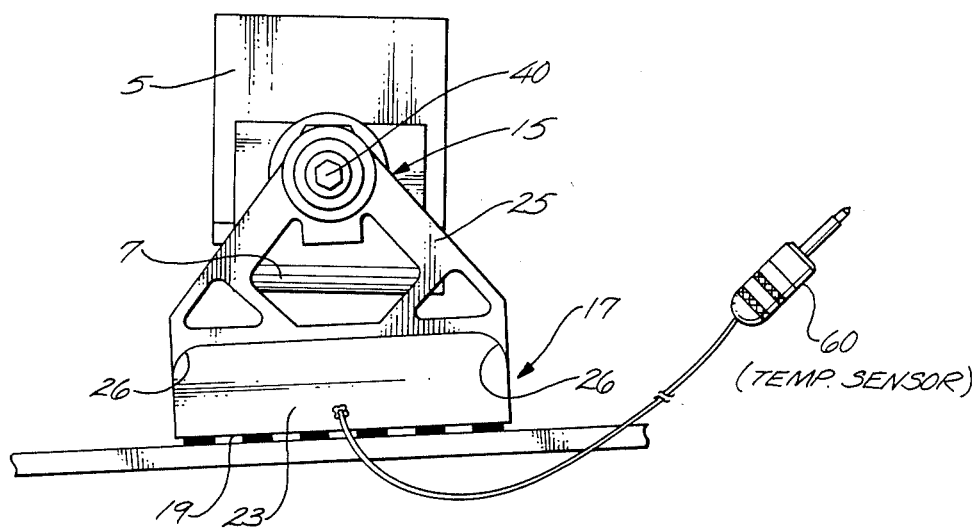

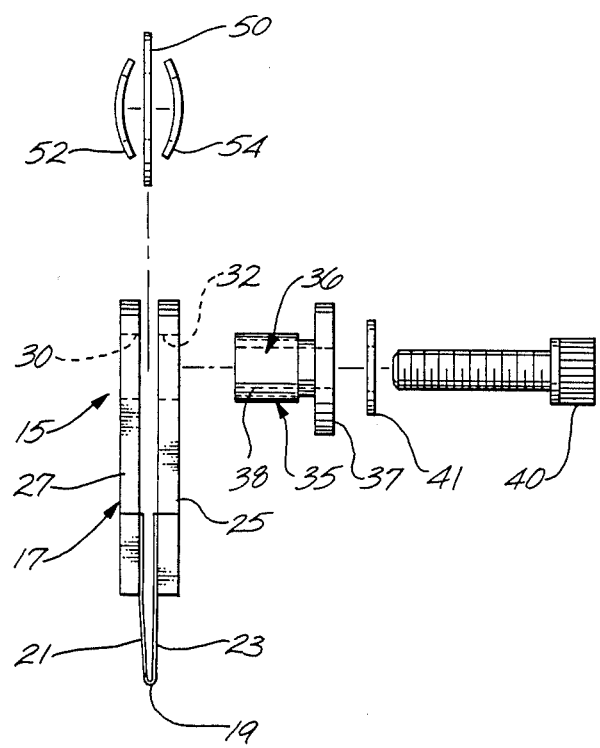

TITIABLE ELECTRIC THERMODE FOR MULTIPLE CONNECTION REFLOW SOLDERING

This is a continuation of application Ser. No. 832,835 filed Feb. 24, 1986, now abandoned.

FIELD OF THE INVENTION

This invention relates to reflow soldering; more particularly, it relates to a thermode for multiple connection reflow soldering.

BACKGROUND OF THE INVENTION

Reflow soldering is a process for soldering together pretinned electrical circuit parts. Reflow soldering is used extensively in the manufacture and repair of printed circuit boards. Some typical applications are soldering of ribbon cable to printed circuit conductors, and soldering of the leads of integrated circuit chips to printed circuit conductors.

One version of a reflow soldering process is called parallel gap reflow soldering. This process involves passing electrical current through the parts to be soldered to form a single joint. Two other process versions are called single point pulse heated reflow soldering, and multiple lead reflow soldering; each of these process versions involves passing electrical current through a reflow soldering tip (a "thermode") that is pressed against the pretinned parts so as to heat them by thermal conduction.

The multiple lead reflow soldering version reduces assembly time because it makes a number of solder joints simultaneously.

To accomplish multiple lead reflow soldering reliably in a production operation involves meeting numerous requirements. Some of these requirements are to provide for heating each of the multiple joints to the same temperature for the same amount of time. To cause the solder to flow, the thermode must supply enough heat to raise the solder temperature to about 600° F., and to make a reliable solder joint, such high temperature must be maintained for a time in the range of about 2 to 10 seconds. Another requirement is to ensure that joint-to-joint voltage gradients are kept sufficiently small so as to avoid damage to associated circuitry.

Meeting these requirements has proven to be a difficult problem in multiple lead reflow soldering. One reason why the problem is so difficult relates to variable heat sinking. That is, each of the two joints that are at the opposite end of a line of joints can conduct heat into the printed circuit board in a different way from the way the interior joints do. Side-by-side joints in the line can distribute heat to one another, whereas an end joint on one of its sides simply conducts heat into the board. Another reason the problem is so difficult relates to various manufacturing tolerances in dimensions. An ideal circumstance would be for the tops of all the pretinned parts of a group to be positioned along a straight horizontal line, so that a thermode could be brought down to make contact with all of them at the same instant, and bear on all of them with the same pressure while supplying heat to them for the required time at temperature. Such a circumstance is purely ideal; the reality in a production operation is that the thickness of the pretinned layer of solder varies in an amount significant to the problem involved here. Other components such as the board, the printed circuit conductors, the leads projecting from integrated circuits are also subject to dimensional variations, and any such dimensional variations can aggravate this problem.

A great deal of effort has been expended on designing thermodes in an effort to meet these requirements, and overcome these problems. Some thermode designs are categorized as bar heaters; others are categorized as fold-up heaters.

A bar heater, in a rudimentary design, comprises a relatively small diameter, electrically insulated wire formed into an upwardly open U shape. That is, it has a central pressing portion and spaced-apart attaching portions. Each of the attaching portions is affixed to a respective one of two terminal plates that form part of the circuit for the heating current. To minimize $I^2R$ loss in the terminal plates, they are generally made of copper and are sized to provide a substantial cross-sectional area through which the heating current flows. In such a rudimentary bar heater, each terminal plate has a generally L-shaped configuration. The terminal plates are positioned side-by-side, so that together they present an inverted T-shaped profile. Each terminal plate has an electrically conductive surface for engaging a corresponding electrically conductive surface defined in a movable mounting support. Mounting means provide for pressing the engaging surfaces together very tightly. A high pressure engagement is necessary to minimize the resistance caused by the surface contacting, and thereby minimize thermal loss. The heating current is in the order of about 100 amps. The wire that serves as the heating element can be made of Nickel-Chrome and can have a thin oxide coating to provide electrical insulation. Such a heating element can be heated by the heating current to a temperature in the order of about 500° C. (932° F.). The electrically insulating oxide coating serves as a means to protect against joint-to-joint voltage gradients. This protection can be very important to ensure that voltage-sensitive integrated circuits on the printed circuit board are not damaged by the operation of soldering the joints.

Such a rudimentary bar heater thermode does not provide any means for dealing with the problem discussed above with reference to dimensional variations causing the joint tops to have varying heights. Furthermore, there are numerous attributes of such a rudimentary bar heater thermode that are not preferable. To begin with, such a rudimentary design has its own tolerance problem. This problem is attributable to the curved portions at opposite ends of the pressing portion that join the pressing portion to the attaching portions. Taking into account such tolerances requires a design center length for the pressing portion such that it will be longer than the linear space from one end joint to the opposite end joint. The round cross section of the wire is not a preferable shape for a thermode heating element; it provides for only a line contact rather than an area contact when pressed down against the multiple leads. The electrical insulation is not preferable because it reduces thermal efficiency. To amplify further on the need for such electrical insulation in such a rudimentary, as well as other bar heater designs, the high heating current causes a voltage gradient along the length of the pressing portion.

As a result of the great deal of effort that has been expended in efforts in this field, improved bar heater thermodes have been designed having more preferred features. So far as is known, no such improved design has provided any means for dealing with the problem discussed above the reference to dimensional variations causing the joint tops to have varying heights. As to improved and more preferred features, bar heater thermodes have been designed to include an essentially flat bottomed heating element so as to provide the more preferable area contact rather the line contact provided by the wire type described above. Another improvement has been made in an effort to deal with the problem associated with the extra heat sinking associated with opposite end joints in comparison with interior joints. In particular, there are flat-bottom bar heaters that have a varying cross section. Near each opposite end, the area of such an improved bar heater's cross section is small in comparison with the area of a cross section taken elsewhere. Inasmuch as resistance of such a conductive element is a function of cross section, it will be appreciated that the current flowing through such an improved bar heater passes through a higher resistance portion of the heater, proceeds through a lower resistance portion, and then passes through another higher resistance portion before proceeding out to the terminal plate. Inasmuch as the heat generated is proportional to the $I^2R$ dissipation, it will be appreciated that higher temperatures can be produced at each opposite end by taking this approach of tailoring the resistance of the heating element along its length. However, there are factors that limit how far one can proceed with this approach. By reducing the cross section close to each opposite end, one sacrifices strength and rigidity.

Turning now to thermodes in the fold up category, such thermodes incorporate numerous preferred features. An important one of these preferred features relates to the direction in which current flows relative to the pressing portion. In contrast to a the bar type heater in which the current flows along the length of the pressing portion, the fold up type thermode has current flow perpendicularly to the pressing portion. The current can be visualized as a wide stream sheeting down, changing direction in passing across the flat bottom, and flowing back as a wide stream. Thus, there is little if any voltage gradient along the horizontally extending length of the pressing portion. Instead, the voltage gradient is developed along the vertically extending portions of the fold up heating element. As a result, there is no need for electrical insulation on the fold up heating element. It can be used safely with even highly sensitive integrated circuits connected to the joints to be soldered. The elimination of need for electrical insulation provides for improved thermal efficiency. Notwithstanding the improvements involved in the fold up thermode, problems have remained unsolved. So far as is known, every prior art thermode in the fold up category, like every prior art thermode in the bar type category, lacks any means for dealing with the problem discussed above with reference to dimensional variations causing the joint tops to have varying heights. Like thermodes of the bar type, thermodes of the fold up type have been rigidly mounted to a movable support in a way that does not admit of accommodating to the circumstance of the joints to be soldered having varying height tops. Further, so far as is known, every prior art thermode in the fold up category, like every prior art thermode in the bar type category, lacks a means that, without sacrificing strength and rigidity, solves the problem of higher heat sinking by opposite end joints in a group of joints to be soldered.

In view of the foregoing, it will be appreciated that there exists a need for an invention to solve the foregoing problems.

SUMMARY OF THE INVENTION

This invention in its broader aspects applies to various types of thermodes for multiple lead reflow soldering. Each thermode embodying the invention is for mounting to a support movable to position the thermode for multiple lead reflow soldering. A particularly preferred embodiment of the invention is a fold up type thermode.

To overcome the above-described problem arising from varying height tops of the group of joints to be soldered, a thermode embodying the invention comprises the following structure. An electrical resistance heating element is shaped to define an elongated pressing portion and opposite end electrical terminal portions. The heating element is capable of responding to current flowing through it so as to generate heat and raise the temperature of the heating element above the temperature at which solder flows. The pressing portion is sufficiently strong and rigid to apply sufficient pressure to a group of joints to be soldered to conduct heat to each such joint to make a soldered joint. The thermode further includes a pair of terminal plates. Each terminal plate is electrically and rigidly connected to a respective one of the terminal portions of the heating element. Distinguishing and highly advantageous features of the thermode relate to the structure provided for mounting it to the movable support. The mounting means cooperates with the terminal plates to adapt the thermode for mounting to the movable support. The mounting means defines first and second electrically conductive surfaces for bearing against cooperating surfaces of the terminal plates with sufficient pressure to effect electrical connections having lower resistance than the resistance of the heating element. Significantly, the mounting means includes means for providing freedom of movement of the thermode relative to the support so that the pressing portion of the thermode can tilt when brought into pressing contact with joints to be soldered having varying height tops.

Preferably, the mounting means include an axle member that defines an axis of rotation for the thermode. The axle member extends through coaxial openings in the terminal plates. An interior electrically conductive surface is provided to form part of the circuit loop for the heating current to pass, from the terminal plate distant from the movable support, to an electrically conductive surface in the movable support. To provide freedom of rotation, while providing a high pressure, low resistance surface contact, means such as Belleville spring washers are employed.

As to the particularly preferred embodiment, it incorporates structure for solving the problem of higher heat sinking by opposite end joints in a group of joints to be soldered, without sacrificing strength and rigidity. To this end, means are incorporated in a terminal plate to affect the distribution of the sheet of current flowing in the fold up heating element. This constitutes a different approach from the prior art approach taken in the context of a bar type heater of varying the resistance of the bar along its length. By providing for a higher current flow in the regions along the opposite edges of the fold up heating element, more heat is available to be conducted to the higher heat sinking joints at the ends of a group of joints to be soldered. This provides a solution to the problem that does not suffer from the countervailing disadvantages of loss of strength and rigidity of the heating element. Preferably, each terminal plate has a generally arch-shaped lower edge to create the desired distribution of current within the sheet of current.

These and other features of the invention are described in detail below and set out in the appended claims.

BRIEF DESCRIPTION OF THE DRAWINGS

FIG. 1 is a side elevation view of a thermode mounted in a conventional movable support by a releasable mounting apparatus also forming part of the invention.

FIG. 2 is a side elevation view of the apparatus of FIG. 1.

FIG. 3 is an exploded view of the thermode and releasable mounting apparatus shown in FIGS. 1 and 2.

DETAILED DESCRIPTION

Figure 4:
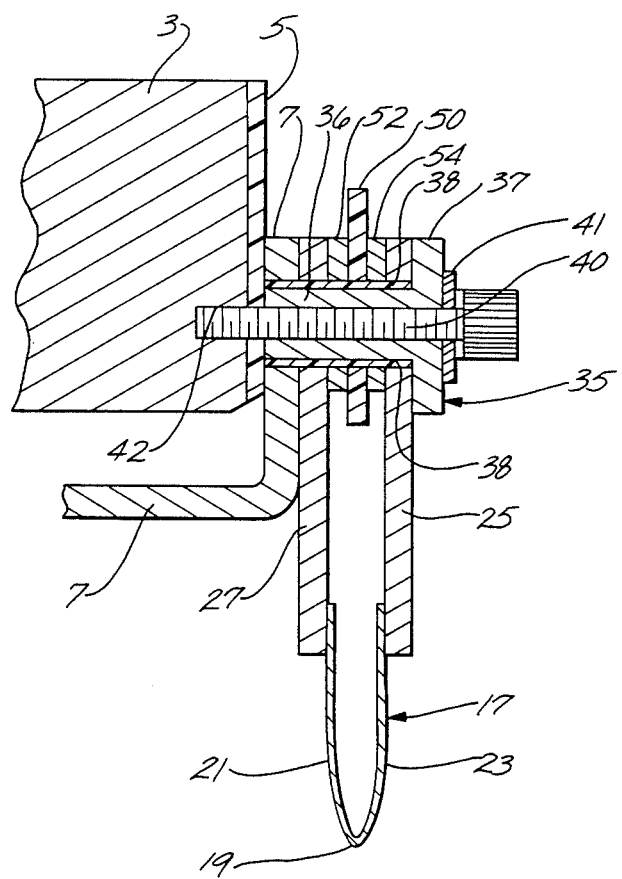
FIG. 4 is an enlarged cross-sectional view, similar to FIG. 1, showing the structural and electrical relationship of components of the thermode and releasable mounting apparatus.

FIG. 1 shows a conventional movable support generally indicated at 1, which is a subassembly of equipment (not otherwise shown) used for effecting multiple lead reflow soldering. The support 1 includes a block member 3 that in the bulk is electrically conductive, but has a front surface 5 that is defined by an electrically insulating layer of material, such as Kapton, a high temperature plastic.

The support 1 also includes a conductive plate member 7 that is mounted to the block member 3. A group of fasteners 9 and insulators 11 are used to mount the plate member 7 to the block member 3. Owing to the Kapton layer covering surface 5, the portions of the plate member 7 that abuts it is electrically insulated from it.

A thermode embodying the preferred features of the invention is mounted to the support 1. The thermode is generally indicated at 15 and includes a fold up heating element 17 that has an elongated pressing portion 19 and terminal end portions 21 and 23. Suitably, the fold up heating element is made of Nickel Chrome.

The thermode 15 further includes a pair of terminal plates 25 and 27 that are electrically and rigidly connected to a respective one of the terminal end portions 21 and 23 of the fold up heating element 17.

With reference to FIG. 3, there will now be described the releasable mounting apparatus elements incorporated in the preferred embodiment to provide for mounting the thermode 15 to the support 1. The terminal plates 25 and 27 are provided with coaxial openings 30 and 32.

A bushing 35 is inserted in the coaxial openings 30 and 32. The bushing 35 has an elongated electrically conductive axle portion 36 and a circular, electrically conductive flange portion 37. The axle portion is hollow and the hollow portion is defined by a cylindrical, electrically conductive surface. A major portion of the outer cylindrical surface of the axle portion 36 has an electrical insulating cover 38 so as to prevent a short circuit between terminal plates 25 and 27. An electrically conductive bolt 40 and a washer 41 are provided. The threads of the bolt 40 thread into an internally threaded tap 42 in the block member 3 (FIG. 1).

As shown at the top of the exploded view of FIG. 3, there are provided an electrically insulating washer 50 and a pair of Belleville spring washers 52 and 54. During assembly, these washers are disposed to align with the openings 30 and 32, and then the axle of bushing 35 is inserted, and then the bolt is threaded in so as to provide good pressure contact and thereby provide two low resistance surface-to-surface connections.

One of these low resistance surface connections is made between the inner surface of terminal plate 27 and the abutting, outer vertical surface of plate 7. Preferably, the vertically extending portion of plate 7 is gold plated. The outer lower resistance surface connection is made between the inner, annular surface of the flange portion of bushing 35 and the outer surface of terminal plate 25. Preferably, gold plating is used to be sure this surface-to-surface connection likewise has low resistance.

Because of the resilience of the spring washers 52 and 54, considerable pressure can be used for achieving the required low resistance surface-to-surface connections, and yet the thermode can swivel about the axis defined by the axle portion of bushing 35. Thus, the pressing portion 19 of the fold up heating element can tilt as shown in FIG. 2. The extent of the tilt shown in FIG. 2 is somewhat exaggerated to illuminate the idea. Generally, only a few degrees of tilting one way or the other suffices to solve the problem of unequal height tops.

The path of the heating current is as follows. It proceeds along plate member 7 including its vertically extending portion; it proceeds across the surface-to-surface connection between the plate 7 and terminal plate 27; it proceeds through terminal plate 27 and around the fold up element 17 and through terminal plate 25; it proceeds across the surface connection between terminal plate 25 and the flange of bushing 35; it proceeds through the internal cylindrical surface of the axle portion 36 of bushing 35; finally, it proceeds through block member 3.

FIG. 4 illustrates the electrical path established between the block 3 and the terminal plate 25. Components of the thermode assembly shown in FIG. 4 are exaggerated in relative size for clarity. The bolt 40 is threaded into the hollow interior of the electrically conductive axle portion 36 of the bushing 35 and is threaded into the tap 42 in the block. The axle portion 36 of the bushing 35 extends through aligned holes in the terminal plates 25 and 27, the spring washers 52 and 54, the electrically insulating washer 50, and the plate member 7. The electrically insulating coating 38 on the axle portion 36 of the bushing 35 electrically isolates the bolt 40 and the electrically conductive axle portion 36 of the bushing 35 from the terminal plate 27 and the plate 7. Thus, electrical connection of the terminal plate 25 and the block 3 is established through the electrically conductive flange 37 of the bushing, along the electrically conductive axle portion 36 of the bushing and the bolt 40 to the block 3. The electrically insulating coating 38 on the bushing avoids an electrical path being established from the bushing 36 and the bolt 40 to the terminal plate 27 and the plate member 7.

A highly advantageous feature involved in the foregoing flow of current will now be explained with reference to FIG. 2. As shown, the lower edge of terminal plate 25 has a generally arch shape at 26. This shape provides for distributing the sheet of current since more flows at the regions near the side edges than in the middle. Each terminal plate may be provided with apertures as shown in FIG. 2.

In operation, the equipment (not shown) moves the movable support downward to engage the pressing portion 17 into contact with the group of joints to be soldered, and to apply pressure against them. The thermode structure swivels as necessary to tilt the pressing portion 17 appropriately. Then, the heating current is turned on, and it flows as described above, causing heating of the pretinned joints substantially uniformly, notwithstanding the differences in heat sinking, etc. To end the heating after an appropriate time at temperature, the thermode has a temperature sensor assembly 60 to sense when the heating plate reaches a threshold temperature. Conventional timing circuitry is triggered to time out the required interval.

What is claimed is:

1. A combination of a thermode and apparatus for releasably mounting the thermode to a support movable to position the thermode for multiple lead reflow soldering, which comprises:

a thermode including an electrical resistance heating element shaped to define an elongated pressing portion and opposite end electrical terminal portions, the heating element being capable of responding to current flowing through it so as to generate heat and raise the temperature of the heating element above the temperature at which solder flows, the pressing portion being sufficiently strong and rigid to apply sufficient pressure to a group of joints to be soldered to conduct heat to each such joint to make a soldered joint;

the thermode further including a pair of terminal plates, each terminal plate being electrically and rigidly connected to a respective one of the terminal portions of the heating element; and an apparatus for releasably mounting said thermode comprising mounting means cooperating with the terminal plates for mounting the thermode to a movable support, the mounting means defining first and second electrically conductive surfaces bearing against cooperating electrically conductive surfaces of the terminal plates with sufficient pressure to effect electrical connections therebetween having lower resistance than the resistance of the heating element, and the mounting means including means for providing freedom of tilting movement of the thermode relative to the support so that the pressing portion of the thermode can tilt when brought into pressing contact with joints to be soldered having varying height tops.

2. A combination according to claim 1, wherein the means for providing freedom of movement includes means for defining an axis of rotation for the thermode relative to the movable support.

3. A combination according to claim 2, wherein the means for defining an axis of rotation includes coaxial openings in the terminal plates and axle means extending through the coaxial openings and into the movable support; the axle means including an electrically conductive portion through which the heating current flows to one of said terminal plates, and an insulating portion to prevent a short circuit between the terminal plates.

4. A combination according to claim 3, wherein the means for providing freedom of movement further includes spring means for resiliently pressing said electrically conductive surfaces of the terminal plates against the respective cooperating electrically conductive surfaces.

5. A combination according to claim 4 wherein the spring means comprises a pair of Belleville spring washers.

6. A combination according to claim 1, wherein the heating element is a fold up heating element comprising a flat resistive heating element folded on its flat side in a U-shape structure in which the bight portion of the U forms the pressing portion and the legs of the U form the terminal portions of the thermode.

7. A combination according to claim 6, wherein at least one terminal plate includes means for affecting the distribution of current flowing through the heating element so that more heat is available to be conducted to opposite end joints than to interior joints of the group of joints to be soldered.

8. A combination according to claim 7, wherein the means for affecting the distribution of current includes a generally arch shaped lower edge of the terminal plate.

* * * * *